Dec. 29, 1964     M. LEDOHOWSKI     3,163,249
DETACHABLE POWERED ENDLESS-TREAD UNIT FOR VEHICLES
Filed Oct. 15, 1962     2 Sheets-Sheet 1
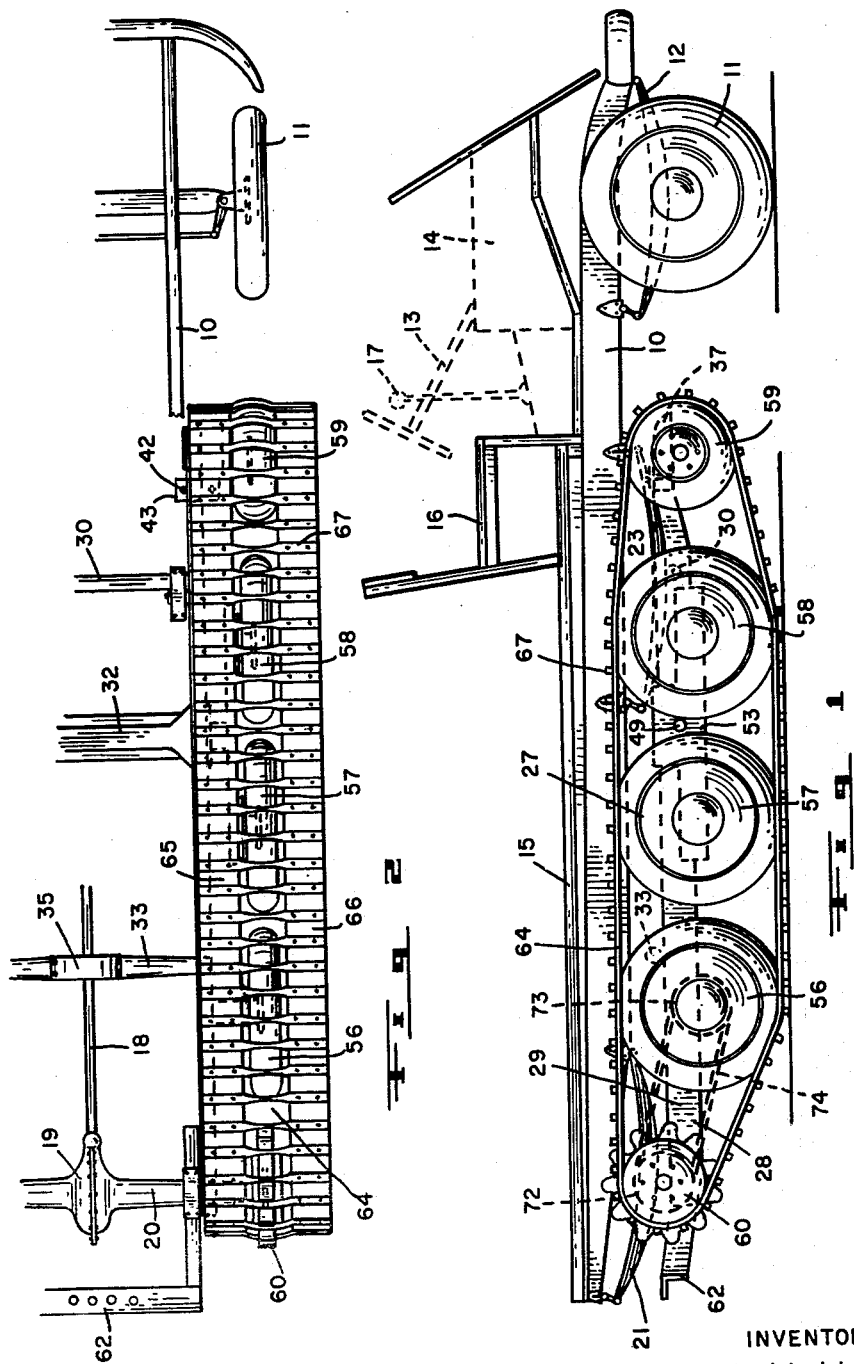
INVENTOR
Michael Ledohowski
by
Agent

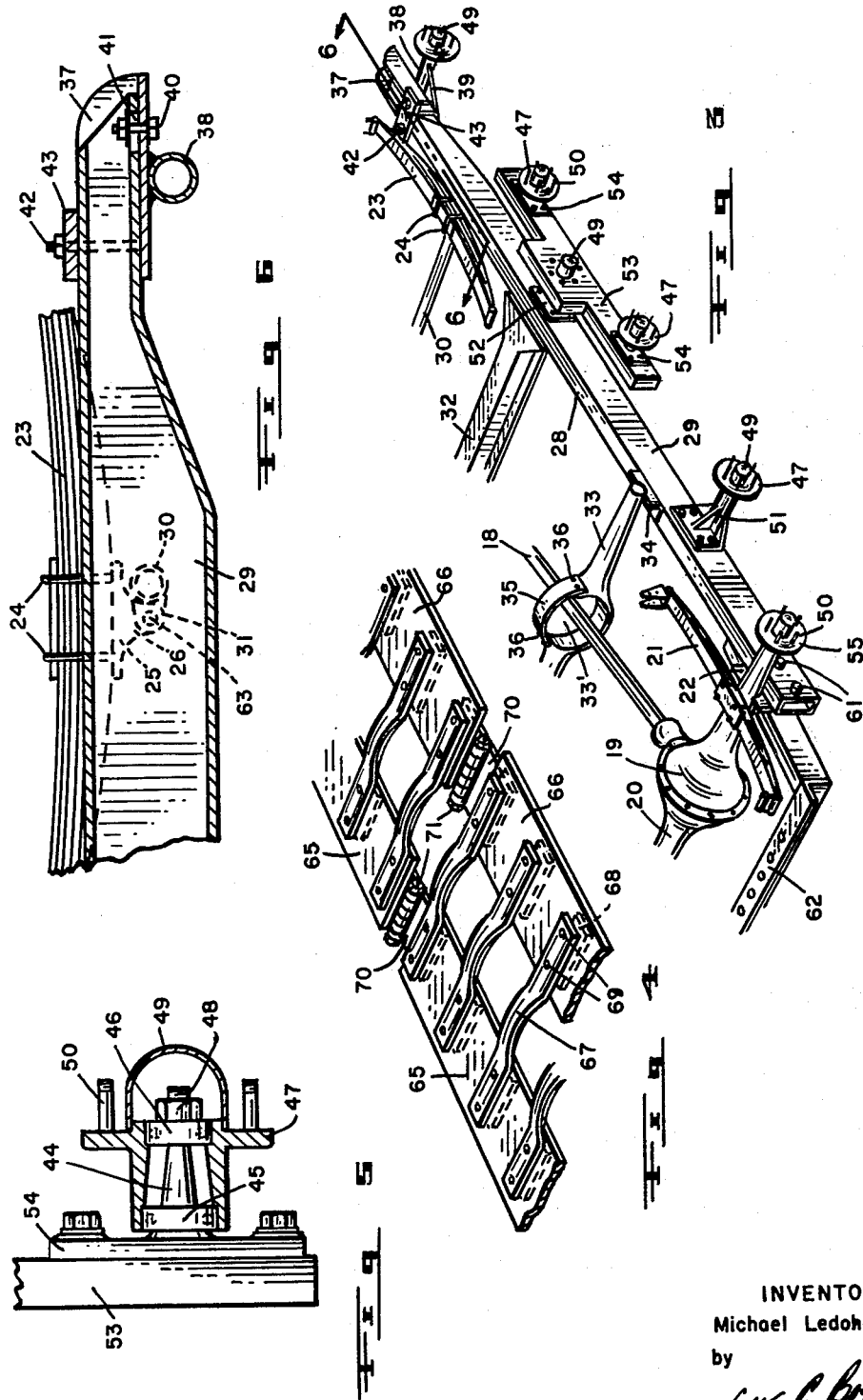

United States Patent Office 3,163,249
Patented Dec. 29, 1964

3,163,249
DETACHABLE POWERED ENDLESS-TREAD
UNIT FOR VEHICLES
Michael Ledohowski, Poplarfield, Manitoba, Canada
Filed Oct. 15, 1962, Ser. No. 230,612
4 Claims. (Cl. 180—9.2)

This invention relates to a power operated vehicle, and the principal object thereof is to provide a wheeled subframe unit, preferably of the endless tread type, for supporting the rear part of the vehicle chassis, and for propelling said vehicle over the the ground by power from said chassis.

A further object of the invention is to attach said sub-frame, or power unit, to the vehicle chassis for quick separation of the two, and such that the power unit can be used with various types of vehicles.

A further object of the invention is to construct said power unit for connection to said vehicle chassis such, that it will provide a heavy load carrying capacity thereto, for passage through rough and dangerous terrain, such as bush, muskeg or swamp, as well as over conventional roads.

A further object of the invention is to attach said power unit to said vehicle chassis such, that the vehicle will have easy steering capabilities when propelled by said unit.

A further object of the invention is to construct the power unit with a floating type or ground wheel support, for increased load carrying capacity, and to improve said easy steering.

A still further object of the invention is to construct the power unit so the endless tread thereon can be quickly removed, and provide a wheeled drive for speedy steered travel of the vehicle over conventional roads.

With the above important and other minor objects in view, which will become more apparent as the description proceeds, the invention consists essentially in the design, construction and arrangement of the various parts hereinafter more particularly described, reference being had to the accompanying drawings wherein like characters of reference indicate corresponding parts in the several figures, and wherein:

FIGURE 1 is a side view of the power unit attached to a vehicle chassis.

FIGURE 2 is a partial plan view of the power unit of FIGURE 1, and parts of the vehicle and chassis.

FIGURE 3 is a partial perspective view of one side of the power unit, and showing the drive from the vehicle.

FIGURE 4 is an enlarged perspective view of a portion of one of the treads of the unit, and the releasable connection therefor.

FIGURE 5 is an enlarged horizontal section through one of the wheel bearings, parts being shown in full view.

FIGURE 6 is an enlarged vertical sectional view taken on the line 6—6 of FIGURE 3, and detailing the belt tightening mechanism.

The chassis of a motor vehicle is indicated at 10 in FIGURES 1 and 2. The front end of this chassis is supported by ground wheels 11, through semi-elliptic springs 12, said wheels being steered in the usual automobile way by a steering column, indicated at 13. The chassis in this particular instance is relatively narrow in width, and said width is the same along its entire length. A front motor, indicated at 14, is supported by the chassis, while a platform 15 rests thereon at the back, and a driver's seat is provided at 16. The motor 14, through the usual gearshift 17, operates a drive shaft 18 to a differential 19 at the centre of a cross housing 20. The housing encloses the usual axles (not shown), which are driven by the drive shaft. The housing 20 is connected, through semi-elliptic springs 21, with the rear of the chassis 10. Vertical, rectangular, fastening plates 22 are shaped to fit around part of the housing 20, one under each end thereof, and they are welded thereto (not shown). Semi-elliptic springs 23 are end supported by hangers from the central part of the chassis, one on each side and below the seat 16. These latter springs are centrally secured, by a pair of spanning U-bolts 24, to a support link plate 25 thereunder (see FIGURES 2 and 6), each link plate having a downward projection 26 with a hole therethrough, for a purpose later explained.

A chassis supporting power unit 27 is provided with a support framework 28. This framework comprises a pair of spaced parallel rails 29 of rectangular-shaped hollow cross section, which form the sides. The front ends of these side rails are spaced apart by a tubular cross member 30, the two ends of which are welded (not shown) to the rails. A pair of clevises, indicated at 31 in FIGURE 6, are welded to the rear of these cross members, one adjacent each end thereof, for a purpose later explained. An I-beam shaped cross member 32 also spaces the side rails at the centre, and a tubular casing 33, having a central circular cross opening 33' there through, space-connects the upper surfaces of the side rails at the rear, through angles 34 to which they are welded. The central circular cross opening of this latter casing has an upper removable strap 35 thereover, which is secured by bolts 36 to the casing. Accordingly, it will be seen that the cross members 30, 32 and 33 not only space but reinforce the side rails 29 to form a strong open framework.

A belt tightening arrangement is provided at the front ends of each of the framework side rails 29, and is shown in FIGURES 3 and 6. The front ends of these side rails are reduced in height and each are received in a U-shaped shoe 37, which has a short tubing 38 welded across thereunder, with one end extending outwardly of the framework. A rod 39 angularly connects each shoe with its corresponding tubing for reinforcement. A bolt 40 passes up through a hole in the front bottom of each shoe, and through a lengthwise slot 41 in the bottom of the side rail thereabove, to hold same together. Stud bolts 42 are welded, one on each side of each shoe, and they secure a cross plate 43 thereover to further anchor the shoes to the side rails. When the bolts 40 and 42 are released, the shoes can be slid along the ends of the rails, the length of the slots 41.

The outer ends of the tubings 38 telescopically receive and are welded to spindles, such as shown at 44 in FIGURE 5. These spindles are adapted to rotatably receive ground wheels, as now described. The spindles are each provided with bearings 45 and 46 which rotatably receive rotors 47 thereover, said rotors being retained by a nut 48 which threads on the end of each spindle and presses against the bearing 46. A dust cap 49 covers the nut and bearings for grease retention. The rotors 47 are each provided with a plurality of stud bolts 50 therearound, for releasably receiving and nut retaining the hubs of the ground wheels, in the well known automobile manner.

The rear parts of the side rails 29 each carry an outwardly projecting bracket 51, adjacent the ends of the tubular casing 33. Each bracket also carries a fixed spindle 44 for wheel rotation in the manner of the tubings 38. The central parts of the side rails 29, adjacent the ends of the cross member 32, are each provided with an outer bracket 52, which also carries a spindle 44. These latter spindles are provided with bearings and a rotor such as shown in FIGURE 5, but the rotors are each secured to the centre of a side balancing bar 53 of a stub inverted T-shape. Each end of the balancing bars are provided with spindles 44, which are on brackets 54, for wheel rotation in the manner of the tubings 38.

It should be mentioned at this time, that all the rotors 47 on the brackets 51, 54 and the tubings 38, are aligned along each side of the framework 28. It should also be mentioned that rotors 55, the same as those 47, are secured to the outer end of each driving axle (not shown) in the housing 20, and turn therewith. These latter rotors will also be aligned with the others on each side of the framework 28, when the power unit is attached to the chassis of the vehicle.

Three automobile ground wheels 56, 57 and 58, with rubber tires, are secured on all the rotors 47 of the brackets 51 and 54, and a small rubber tired wheel 59 is secured in the same manner to the rotors 47 of the tubings 38. At the same time, a driving sprocket 60 is secured to each of the rotors 55 of the drive axles (not shown) in the housing 20 of the vehicle. When these wheels and sprockets are in place, the power unit is ready for attachment to the vehicle.

In attaching the power unit 27 to the chassis 10 of the vehicle, the strap 35 is removed from the casing 33. The vehicle chassis is then jacked up and the power unit rolled thereunder on the ground wheels 56, 57 and 58 until the extreme rear end of the framework 28 is adjacent the housing 20, with the plates 22 inside the side rails 29. The chassis is then lowered until the housing 20 rests on the rear ends of the side rails 29, and the projections 26 of the link plates 25 are received in the clevises 31. At this time, the drive shaft 18 should be in the cross opening 33' of the casing 33. Bolts 61 are then passed through the side rails to secure the plates 22 thereto, at which time a U-shaped drawbar 62 (see FIGURE 3) is slid inbetween said plates, and secured in place by the same bolts. Bolts 63 are then passed through the clevises 31 and the link plates to complete the chassis-power unit connection, and the strap 35 is re-bolted to the casing 33, over the drive shaft 18.

When the power unit is thus secured to the vehicle, an endless tread 64 is provided for each side thereof, over said wheels and sprockets. These endless treads each consist of a pair of spaced rubber belts 65 and 66, which are connected at spaced intervals therealong by cross bars 67, the central portions of which are outwardly curved-pressed, and in a U-shaped cross section, as shown in FIGURE 4. The ends of these cross bars are riveted through the rubber belts to rectangular-shaped plates 68 on the inner sides thereof, as shown at 69. The ends of each of said belts, on their inner sides, are provided with hinge forming plates 70, which are really enlargements of the plates 68, the rolled portions thereof projecting past the ends of the belts. In attaching the tread to the power unit, the belts are laid on the ground, behind the vehicle, which is then rolled thereon. The ends of the belts are then wrapped around the wheels and drive sprockets, as shown, to bring the hinge plates 70 into hinge mesh, and bolts 71 are secured therethrough, to complete the continuous tread.

To tighten the above treads, the bolts 40 and 42, holding the shoes 37, are loosened. Any well known bumper jack (not shown) can be positioned horizontally on the inner side of one of the treads, the base of said jack resting against the front side of the tubular cross member 30, while the bumper lifting portion enters the short tubing 38 of the shoe. By operating the jack in the usual lifting manner, the shoe 37 is moved forwardly of the side rail 29 until the correct tension is obtained on the tread. The bolts 40 and 42 are then re-tightened, and the jack released and removed.

By the above construction and arrangement of the various parts, the drive shaft 18 can rotate the drive sprockets 60 when the motor is operated, and as the sprockets mesh with the treads 64, said treads are driven thereby, moving the vehicle over the ground and rotating the wheels which travel on the cross bars between the belts. This vehicle will travel with ease along conventional roads at a fairly fast clip. It will also make its own path through bush, positively pushing over light trees in its road without effort, due to the powerful traction obtained. Its outstanding performance however is in travelling safely over soft terrain, such as bog and muskeg. The large ground contacting area of the treads result in very light-weight pressure per square inch of surface, thus preventing normal sinking, while the traction obtained insures a positive drive over this soft surface.

It might be mentioned that a previous vehicle was constructed in which the above mentioned wheels were mounted directly on the chassis of the vehicle. In such soft terrain, the front steering wheels 11 were inclined to dig, or bog down into the ground when the vehicle was operated, stalling the machine almost instantly. With the present construction, the power unit is resiliently mounted below the chassis of the vehicle, supporting same through the springs 21 and 23. Accordingly, when the motor drives the machine forwardly, the drive shaft pinion in the differential (not shown) tends to climb up the crown gear therein (not shown), thus releasing considerable weight from the front steering wheels, while the drive sprockets 60 tend to swing the framework 28 of the power unit downward, providing increased traction. In other words, the two units (power unit and the chassis) tend to have a hinging action in relation to each other. Also, in travelling, the lower front ends of the tread are always climbing, thus tending to lift the wheels 58, rock the balancing bars 53, and push the wheels 57 downward. The result is that, instead of the ground wheels staying level, as shown in FIGURE 1, the wheel 58 rides high, the wheel 57 rides low, and the wheel 56 is central of the two, the three thus forming a dipped curve, with the central wheel 57 the lowest. Obviously, as the front wheels 11 have considerable horizontal leverage on the power unit, when turning, and the central ground wheel 57 is the lowest of the three, as above explained, any direction change of the front wheels instantly communicates thereback, and turning is extremely easy, principally on the wheels 57, the differential permitting the variation in speed of the two side treads in the well known automobile manner. As the balancing bars 53 give a floating effect, and the power unit is resiliently connected to the vehicle chassis, the said power unit rides over rough country and rocks with a kind of back and forth rolling action, the balancing bars teetering, and the shocks are hardly felt by the vehicle chassis, thus making comfortable travel.

If the vehicle is to be transported over a highway for a considerable distance, such as for use in another location, the ground wheels 56 and sprockets 60 can each be equipped with V-belt pulleys 73 and 72 respectively, and both the same size, and secured by the same stud bolts 50 (see dotted outline in FIGURE 1). When such pulleys are provided, the endless treads 64 can be removed from the wheels 56, 57 and 58 and sprockets, so said wheels can ride directly on the road, while V-belts 74 used to connect the V-belt pulleys. Naturally, the side plates of the pulleys will be adjustable for V-belt tightening (not shown). By this arrangement, the ground wheels 56 can be directly driven at the usual automobile speeds, and fast, efficient, and economical transportation is provided for the vehicle to the new location. And, the double spring suspension on each side, plus the floating effect of the wheels 57 and 58, will permit heavy loads to be carried safely and comfortably. When desired, the V-belts can be removed and the treads quickly re-placed, as above described.

While the power unit has been shown connected to a truck chassis, it will be appreciated that other bodies, such as coupes, sedans, or station wagons could all be provided with the same method of support, and would be interchangeable, providing the chassis are the same width therealong, as previously mentioned. All that is necessary is to jack up the rear part of the vehicle chassis, remove the treads, the bolts 61 and 63, and the strap 35. The power unit can be rolled back out from under the chassis, and if the next vehicle has the rear part of the chassis jacked up, the said power unit can be rolled thereunder and everything re-connected in the reverse manner, including attachment of the treads.

From the above it will be seen that the chassis of the vehicle, with motor and transmission, form one part of the new combination, while the drive unit forms the second part for attachment thereto. When combined, the motor of one drives the supporting wheels of the other for the above transportation mentioned, while the vehicle front wheels do the steering, which is much easier than would be expected for an endless tread drive. Said front wheels freely lead the way, without any tendency to dig-in or bog down to stop the machine's passage. The same ease of steering results when the machine is travelling on asphalt highways.

What I claim as my invention is:

1. In combination with a vehicle chassis, having a pair of front steerable wheels; an operating unit therefor, comprising: a framework underlying the rear portion of said chassis; spring means between each end of said framework and said chassis for resiliently supporting said chassis therefrom; a pair of balancing bars, each centrally and pivotally mounted on one side of said framework; four ground wheels, each rotatably supporting one of the ends of said balancing bars; a pair of further ground wheels rotatably supporting said framework, one on each side thereof, and in spaced tandem relation behind said first mentioned ground wheels; a pair of elevated idler wheels, each mounted for adjustable end-sliding movement on one of the front corners of said framework; a pair of sprockets, each rotatably mounted on a side of said framework, adjacent one of the rear corners thereof; said idler wheels and sprockets in alignment with said ground wheels, on each side of said framework; a movable tread encircling said wheels and sprocket on each side of said framework; said treads each comprising a pair of spaced endless belts which straddle their respective wheels and sprocket, with cross bars connecting said belt-pairs at spaced intervals therealong to form racks for meshing with said sprockets and provide tracks for said ground wheels to travel on; means for locking said idler wheels in tread-tightened positions on said framework; and means on said chassis for driving said sprockets through a differential transmission.

2. In combination with a vehicle chassis, having a pair of front steerable wheels; an operating unit therefor, comprising: a framework underlying the rear portion of said chassis; spring means between each end of said framework and said chassis, for resiliently supporting said chassis therefrom; a pair of balancing bars, each centrally and pivotally mounted on one side of said framework; four ground wheels, each rotatably supporting one of the ends of said balancing bars; a pair of further ground wheels rotatably supporting said framework, one on each side thereof, and in spaced tandem relation behind said first mentioned ground wheels; a pair of drive means, one on each side of said framework, adjacent the rear corners thereof, and for driving one of said further ground wheels; and means on said chassis for driving said drive means, through a differential transmission.

3. In combination with a vehicle chassis, having a pair of front steerable wheels; an operating unit therefor, comprising: a framework underlying the rear portion of said chassis; spring means between each end of said framework and said chassis, for resiliently supporting said chassis therefrom; a pair of balancing bars, each centrally and pivotally mounted on one side of said framework; four ground wheels, each rotatably supporting one of the ends of said balancing bars, and in tandem relation on each side of said framework; a pair of elevated idler wheels, each mounted for adjustable end-sliding movement on one of the front corners of said framework; a pair of sprockets, each rotatably mounted on a side of said framework, adjacent one of the rear corners thereof; said idler wheels and said sprockets in alignment with said tandem ground wheels on each side of said framework; a movable tread encircling said wheels and sprocket on each side of said framework; said treads each comprising a pair of spaced endless belts which straddle their respective wheels and sprocket, with cross bars connecting said belt pairs at spaced intervals therealong, to form racks for meshing with said sprockets and provide tracks for said ground wheels to travel on; means for locking said idler wheels in tread-tightened positions on said framework; and means on said chassis for driving said sprockets through a differential transmission.

4. In combination with a vehicle chassis, having a pair of front steerable wheels and a rear differential transmission within a housing, said housing being resiliently connected to the rear of said chassis; an operating unit therefor, comprising: a fastening plate carried by each end of said housing; resilient means suspended from each side of said chassis, in spaced relation ahead of said housing; a framework underlying the rear portion of said chassis; the rear end of said framework releasably connected to said fastening plates, and the front end of said framework releasably connected to said resilient means, for rear support of said chassis by said framework; a pair of balancing bars, each centrally and pivotally mounted on one side of said framework; four ground wheels, each rotatably supporting one of the ends of said balancing bars, and in tandem relation on each side of said framework; a pair of sprockets, each rotatably mounted on one of the ends of said housing, and aligned with the ground wheels on one side of said framework; a movable tread encircling each set of side wheels and their corresponding sprocket; said treads each comprising a pair of spaced endless belts straddling their respective wheels and sprockets, with cross bars connecting said belt pairs at spaced intervals therealong, to form meshing racks for said sprockets and central riding tracks for said ground wheels; means on said chassis for driving said sprockets, through said transmission; and said housing and said resilient means manually releasable from said framework, for withdrawal of said framework therefrom on said ground wheels, when said chassis is otherwise supported.

References Cited by the Examiner
UNITED STATES PATENTS

| 1,682,622 | 8/28 | Lofstrom et al. | 180—5 |
| 2,312,071 | 2/43 | Broadwater | 180—5 |
| 2,749,189 | 6/56 | France et al. | 180—5 X |
| 2,925,873 | 2/60 | La Porte | 180—5 |

PHILIP ARNOLD, *Primary Examiner.*

LEO FRIAGLIA, *Examiner.*